(12) United States Patent
Smith

(10) Patent No.: US 7,217,435 B2
(45) Date of Patent: May 15, 2007

(54) CHERRY NUTRACEUTICAL

(76) Inventor: Mary A. Smith, P.O. Box 198, Omena, MI (US) 49674

( * ) Notice: Subject to any disclaimer, the term of this patent is extended or adjusted under 35 U.S.C. 154(b) by 772 days.

(21) Appl. No.: 10/638,890

(22) Filed: Aug. 11, 2003

(65) Prior Publication Data

US 2004/0037938 A1 Feb. 26, 2004

(51) Int. Cl.
 *A23L 1/212* (2006.01)
 *A23L 1/29* (2006.01)
(52) U.S. Cl. ............ 426/615; 426/478; 426/489; 426/490; 426/492; 426/495; 426/524
(58) Field of Classification Search ............ 426/615, 426/648, 478, 489, 490, 492, 495, 524
See application file for complete search history.

(56) References Cited

U.S. PATENT DOCUMENTS 2,395,498 A * 2/1946 Noyes .................. 426/384

OTHER PUBLICATIONS

Tressler et al. 1957 The Freezing Preservation of Foods, Avi Publishing Co., Inc. Westport, Conn. vol. 1, pp. 606-611,.*

* cited by examiner

*Primary Examiner*—Helen Pratt
(74) *Attorney, Agent, or Firm*—Bernd W. Sandt

(57) ABSTRACT

A concentrated cherry nutraceutical is prepared by extracting cherry juice from cherries and repeatedly freezing the cherry juice and separating cherry juice of increased concentration while maintaining the juice at freezing conditions.

11 Claims, No Drawings

CHERRY NUTRACEUTICAL

FIELD OF THE INVENTION

This invention relates to the preparation of a nutraceutical product, which is obtained by concentration of juice obtained from cherries and similar fruits. The present application is a continuation in part of my provisional application Ser. No. 60/405,153, filed Aug. 22, 2202.

BACKGROUND OF THE INVENTION

In recent years it has become known that the juice of cherries contains a number of ingredients, which have a beneficial health effect. Thus cherry juice has been found to contain a number of valuable antioxidants and related compounds that have anti-inflammatory properties. In particular tart cherries of the Montmorency variety have been found to be rich in anthocyanins and other organic constituents, which have been shown to have beneficial health effects. Anthocyanins have been found to reduce size of varicose veins. Recent studies have shown that antioxidant compounds in cherries are ten times stronger than aspirin or ibuprofen in relieving pain. Daily consumption of cherries or cherry juice has been shown to ease the pain of arthritis, headaches and even gout. Researchers have also discovered that cherries are packed with perillyl alcohol, a natural chemical that not only flushes cancer-causing substances out of the body, but also helps stunt the growth of cancerous cells. Perillyl alcohol is so powerful, it can slash the incidence of cancer by as much as 50 percent Melatonin is another powerful anitoxidant contained in cherries that acts on problems mentioned above as well as improving the natural sleep pattern of the human body.

It is impractical from a standpoint of commercially utilizing cherries as a nutraceutical product to either dry the fresh cherries as such or to simply extract the juice from the cherries, although such products do find utility as food and beverage products. Thus it is commercially necessary to produce a concentrated juice containing a high percentage of the ingredients benefiting human health. There are various factors, which make the concentration of cherry juice a problem. Thus the juice from conventional tart cherries, and particularly Montmorency cherries, contains an enzyme {believed to be polyphenyloxidase}, which contributes to poor flavor and color instability of its juice. Although the enzyme obviously needs to be removed for a commercially viable product, heating the juice, which causes the enzyme to decompose, also causes the antioxidants and other organic components to degrade and lose some of their efficacy. There is therefore a need to provide a method of concentrating cherry juice, which separates the undesirable enzymes and also concentrates cherry juice to a concentration at which it finds commercial utility as a nutraceutical without decomposing the antioxidants and other beneficial components contained in cherries.

U.S. Pat. No. 5,234,708 discloses a method of preparing a concentrated cherry juice of improved flavor by a freezing and thawing process. The resulting product, although useful as a food additive or beverage, does not have a high enough concentration of the nutraceutical components of cherry juice to serve the purpose of a nutraceutical product.

BRIEF DESCRIPTION OF THE INVENTION

The present invention is based on the discovery that a cherry juice concentrate, which preserves the structure of the nutraceutical ingredients can be obtained by a repeated freezing, partial thawing and separation process, in which the temperatures are not raised above the ambient temperatures experienced by the cherries during the growing season. More specifically it has been discovered that a concentrated product having a Brix value of at least 45, and preferably in the range of 50 to 65, can be obtained that has preserved the nutraceutical components of cherry juice through a series of freezing, partial thawing and separation steps at ambient temperatures. Brix values are a well-known measure of the sugar content of a fruit juice, which also roughly corresponds to the specific gravity of the liquid. The Brix value also is a measure of the concentration of other ingredients contained in cherry juice, including those which are effective in improving health. The process of the present invention is equally applicable to other fruit products such as blueberries and cranberries that contain nutraceutical components which are decomposed when heated to elevated temperatures. The process may also be used with fruit products such as grapes where it is desirable for other reasons to obtain a highly concentrated juice.

DETAILED DESCRIPTION OF THE INVENTION

The cherries from which the nutraceutical is made should be cleaned, ripe cherries having a Brix value of at least 12. Although only Montmorency cherries and juice extracted from such have been extensively studied from a standpoint of health benefit and are preferably used in the present invention, the process of the present invention can be equally employed with other cherry varieties. It is important to pit the cherries in such a manner as to minimize pit breakage because crushed pits are believed to release benzaldehyde, which adds an undesirable taste to the concentrate and causes problems when using a microprocessor in the further handling of the cherries.

The pitted cherries must be frozen and then at least partially thawed before the juice is pressed from them. It has been shown that the step of freezing and then increasing the temperature before the juice is pressed causes desirable ingredients contained in the skin of the cherries to be released. It is preferred that the cherries be maintained in the frozen state for at least 30 days, since such improves the content of the nutraceutical components in the concentrate. After the cherries are thawed, the juice is separated from the cherries by a variety of methods including cold pressing. Hot pressing is to be avoided since any increase in temperature above ambient will lead to some decomposition of the efficacious components of the concentrate. Cold pressing is well known in the industry and employs equipment such as the "Suntech" basket press or a "Goodnature Products" squeeze box press. In the alternative the cherries may be comminuted in a "Urschel Commitrol" microprocessor while still in a semi-frozen mushy state and the resulting juice drained from the comminuted mixture by such methods as centrifuging. The latter technique is believed to provide the greatest concentration of efficacious components for the nutraceutical product of the present invention. The resulting juice can be filtered or centrifuged to remove unwanted fine solid ingredients, even though these solids are essentially removed in the following processing steps.

The most preferred way of preparing the intermediate juice product and one that retains the highest concentration of the active nutraceutical ingredients involves the use of a centrifuge. Thus cherries are depitted and frozen for storage purposes. When ready to be processed the cherries are then comminuted at temperatures of about 17 to 24° F. in a "Urschel Commitrol" microprocessor. The resulting product is maintained at that temperature and then loaded into the basket of a centrifuge to separate juice from cherry solids and ice. The centrifuge conditions may be varied to result in the desired product. Thus preferably the conditions such as temperature, spinning time and speed, are adjusted to give a product of the desired Brix value at the highest yield. For the purposes of preparing the concentrate it is most desirable to adjust the centrifuge conditions to obtain a juice having a Brix value of about 17–28. Using a spin cycle of about 1000 rpm it is possible to obtain the desired juice in less than a minute at temperatures of 17–24° F. The centrifuge filters should allow the juice to pass but not the ice crystals or the cherry solids. Any food grade commercially available centrifuge may be employed for separating the intermediate juice from the solid cherries. The Levin Corp. of Hatboro Pa. for example manufactures such centrifuges. Using the foregoing technique a fruit juice is obtained that finds utility as a beverage containing the beneficial ingredients of cherries.

In order to prepare the concentrate the resulting juice, regardless of the method that it is initially employed, is then frozen, preferably into solid shapes that allow for rapid thawing and further juice separation. For gravity separation experience has shown that blocks having a thickness of 1–4" are preferred from the standpoint of ease of handling. Plastic 0.5 gallon containers are one suitable means of forming the blocks. Freezing should be carried out at temperatures of about −20 to 0° F. and should be continued until completely frozen. The endpoint is frequently indicated by a deep red syrup exuding from the frozen block. This syrup can be combined with the juice to be retrieved from the frozen block. The color of the frozen block changes during the thawing process from a deep red to an almost white color but retains it general shape. In processes using a centrifuge the juice is frozen into sheets that can readily be broken up to pieces suitable for the separation of the concentrate from the ice in the basket of a centrifuge.

The freezing process is believed to result in a crystal structure specific for the Brix value of the juice, which melt at different temperatures. The higher the Brix value the lower the temperature required to freeze the juice. It is believed that the undesirable components are retained in the crystal structure while the soluble desirable components separate from the crystals. However regardless of the theory, the juice that separates from the frozen block is more concentrated at the beginning of the thawing step and decreases as thawing proceeds. Although the very initial extract may have a sufficiently high Brix value to be useful as a nutraceutical, it is obtained in such low yield (1–5%) that it is impractical to separate such from the rest of the cherry juice and discard the remainder.

The thawing of the frozen block is conducted at ambient temperatures above the freezing point of water at about 40° F., although temperatures at the block itself should not exceed more than 5° F. above the freezing point of the juice in the block. Juice separation starts immediately when the frozen block is removed from the freezer. As the juice is separated, the block becomes porous in appearance without any significant change in dimensions. This controlled thawing causes the separation of the undesirable components of the original cherry juice, which are retained in the crystal structure, from the nutraceutical, components which are contained in the extracted, concentrated juice.

The separation of the juice in the blocks can be accomplished by using gravity or applying a vacuum. The endpoint of the separation is physically observable by the porous appearance of the block itself and its almost white color. It generally occurs when about 45 to 52% of the weight of the block has been extracted as a liquid.

Usually the gravity thawing is accomplished by placing the block on a porous surface and allowing the extract to drain into a separate container, which keeps the extract separated from the thawing block. If the separation is continued until about 50% of the frozen block has been separated the resulting juice will have a Brix value of about 19–22. If the separation is stopped at about 45% the juice has a Brix value of about 28–30. When using a vacuum, the separation is stopped at about 35–40% separation and the Brix value of the resulting juice is in the Brix range 28–30. The initial freezing and thawing cycle has also been described in U.S. Pat. No. 5,234,708, the teachings of which are hereby incorporated by reference. The method employed in the second step of the invention determines the extent and method of separation in the first step.

From the standpoint of a nutraceutical product, the concentration of the efficacious components in the juice extract obtained by the initial freezing, thawing and separation cycle is too low. Any attempt to heat the product to increase the concentration is unacceptable since the heating tends to decompose some of the antioxidants and other valuable ingredients. In accordance with the present invention two methods are employed to further concentrate the separated product through freezing.

It was found that a second freezing, thawing and separation cycle is necessary to increase the Brix value to at least 45–50 and even higher at yields superior to those that can be obtained in any single extraction, thereby providing an economic means of producing a nutraceutical. One way of carrying out the second freezing is to use the extract of the first separation having a Brix value of 18–22 and freeze such in a manner used for the first extraction. However the freezing has to be conducted under more stringent conditions since crystal formation does not occur until the temperature is lowered to about 19° F. Again a red syrup separates from the frozen block upon complete freezing.

Several different steps can be used to separate the nutraceutical concentrate from the frozen block. Gravity separation is conducted until about 40% of the weight of the original block has been thawed and results in a concentrate having a Brix value of 45, which is useful as a nutraceutical. As in the first separation, a more concentrated product can be separated by using a vacuum. Again a substantially white porous block is left after the thawing cycle. When using a vacuum the thawing is carried out until about 35% of the weight of the original block has been thawed and results in a concentrate having a Brix value of 49–50.

It may however be desirable to further increase the Brix value. This can be accomplished through ambient evaporation by refreezing the concentrate a third time and letting it slowly thaw at room temperatures until no further measurable weight loss is observed. If desired the cycle can be repeated until a product with the desirable Brix value is obtained. In this way a concentrate having a Brix value as high as 65 can be obtained depending on the number of times the freezing-thawing cycle is used.

In a more preferred manner the intermediate frozen juice having Brix values of about 17–28 is broken up in to small pieces and then centrifuged at about 3 to −5° F. to result in a concentrate having Brix values above 50.

In the alternative, if the first extraction is stopped at about 45% separation and the resulting extract has a Brix value of about 28, it is possible to increase the Brix value by separating the water from the frozen block through evaporation at room temperature as already described.

C. A less preferred third alternative is to freeze the concentrate from the first extraction having a Brix value in the range of 10–28 in a closed container with a narrow opening and allow the ice as it is formed and expands in the container to squeeze out the desired nutraceutical product. It is important to keep removing the highly concentrated juice on a continuing basis as it is formed to keep it separating. This method however results in lower yields compared to the others but extremely high Brix values.

The product obtained by the concentration process of the present invention can be pasteurized by heating to maintain its freshness or stored in frozen form. It should be recognized however that pasteurization if carried out at too high temperatures will decrease the efficacy of the product. The product is preferably marketed in sealed plastic containers. When sold to a consumer and opened it should be refrigerated in order to prevent spoilage.

EXAMPLE I

Montmorency cherry juice was obtained by depitting, freezing and pressing while partially thawed freshly harvested cherries. The resulting juice, having a Brix of 13.1, was poured into a 0.5-gallon plastic bottle with a neck narrower than the sides of the bottle. The container was placed into a freezer and frozen at a temperature of 0° F. until a dark red syrup started to exude from the top of the container. At that point the container was removed from the freezer and exposed to temperatures of 34 to 40° F. The bottle was punctured at the top and placed up side down to allow juice to drain out of the container. The container was attached to a vacuum system that allowed juice to drain at an increased rate. The extraction was continued until about 45–50% by weight of the frozen material had drained out of the container. The color of the remaining frozen material was essentially off-white. The concentrate obtained had a Brix value of about 26–28.

The concentrate was again poured into half-gallon containers and refrozen in the same manner. The frozen product was further concentrated by exposing the container to temperatures of 36 to 40° F. for about 90 minute while applying a vacuum, A similar frozen concentrate was also separated by gravity over three hours. The resulting concentrate was a dark red, slightly viscous liquid having a Brix value of 45.

This concentrate was further concentrated by placing the product of the second extraction in shallow open trays to a depth of about 0.5" and freezing the concentrate again at 0° F. and then allowing the concentrate to thaw at ambient temperatures until no further measurable weight loss is observed. After two such freezing and thawing cycles the resulting concentrate was found to have a Brix value of 60. The deep red color of the concentrate and its slightly tart sweet taste were retained after storage for six months in a closed container at refrigerator temperatures.

EXAMPLE II

Montmorency cherries were depitted and frozen to a temperature below 0° F. and then comminuted in a Cuisineart food processor at about 23° F. The cherries were then placed at the temperature of about 20° F. in the basket of a centrifuge manufactured by the P.B. Corporation having a US mesh size of about 120 and spun for 2 minutes at a rpm of 1000. The basket had a diameter of 5¼" and a depth of 1¼". A juice having a Brix value 19.5 at a yield of about 40% by weight of the cut cherries was obtained. The resulting juice was frozen into about 0.5" slabs, broken up into pieces and placed back into the basket of the centrifuge at a temperature of −3.4° F. A concentrate having a Brix value of 57 was separated using a spin cycle of 1000 rpm for 30 seconds.

It should be understood that the foregoing procedures are not to be construed as limiting and can be modified depending on the fruit involved and the end product desired. The product of the present invention is a natural product that has established health benefits, including alleviation of arthritis and in decreasing and shrinking of cancer cells, when consumed on a continuing basis. Recommended daily doses include one tablespoon.

The invention claimed is:

1. A method for preparing a cherry nutraceutical which comprises, comminuting cherries and separating cherry juice from cherries at temperatures of 17 to 24° F. to produce a concentrate having a Brix value of about 19–28, refreezing the resulting cherry concentrate to temperatures from −5 to +3° F. and separating a cherry nutraceutical having a Brix value of at least 45–50.

2. The method of claim 1 wherein the comminuted cherries is frozen into blocks prior to separation and separated by gravity or a combination of gravity and a vacuum at block temperatures of 17 to 24° F.

3. The method of producing cherry concentrate of claim 2 wherein the ice crystals of the block formed in the second extraction are recombined with concentrate of the first extraction.

4. The method of claim 1 wherein the cherry nutraceutical product having a Brix value of 45–50 is further concentrated to a Brix value of about 65 by further refreezing the concentrate as layers in shallow pans thawing such at room temperature and low humidity until no further measurable weight loss occurs and recovering a concentrate of higher Brix value.

5. The method of claim 1 wherein the first extraction is stopped at a Brix value of 19–22 and refreezing the concentrate in containers with necks smaller than the cross sectional area of the container and collecting the concentrate forced out of the container by crystallization pressure.

6. The method of claim 1 wherein the cherries are Montmorency cherries having a Brix value of at least 12.

7. The process of claim 1 wherein the cherry concentrate is refrozen into blocks and the nutraceutical product is separated by gravity or a combination of gravity and a vacuum.

8. The process of claim 1 wherein the original cherry juice is obtained by freezing pitted cherries for at least 30 days and pressing such when thawed.

9. The process of claim 1 wherein the separation of the nutraceutical is accomplished by applying a vacuum to the frozen juice.

10. The process of claim 1 wherein a vacuum is employed to separate the concentrate from the frozen block.

11. The process of preparing a cherry juice concentrate which comprises, depitting Montmorency cherries having a Brix value of about 12 or higher, comminuting such at a temperature of about 17 to 24° F., centrifuging the comminuted cherries at that temperature to separate a cherry juice having a Brix value of about 17 to 28, refreezing such juice and centrifuging the frozen juice at a temperature from −5 to 3° F. to separate a concentrate having Brix values over 50.

* * * * *